United States Patent
Sato

(10) Patent No.: US 6,580,806 B1
(45) Date of Patent: Jun. 17, 2003

(54) IMAGE PROCESSING APPARATUS, IMAGE PROCESSING METHOD AND STORAGE

(75) Inventor: Hajime Sato, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/442,990

(22) Filed: Nov. 19, 1999

(30) Foreign Application Priority Data

Nov. 20, 1998 (JP) ............................................ 10-330836

(51) Int. Cl.[7] .............................. G06K 9/00; H04L 9/00
(52) U.S. Cl. ...................................... 382/100; 380/277
(58) Field of Search ........................... 382/100; 380/277

(56) References Cited

U.S. PATENT DOCUMENTS

| | | | | |
|---|---|---|---|---|
| 5,572,499 A | * | 11/1996 | Kohtani et al. | 369/83 |
| 5,765,152 A | * | 6/1998 | Erickson | 707/1 |
| 6,002,772 A | * | 12/1999 | Saito | 705/58 |
| 6,141,753 A | * | 10/2000 | Zhao et al. | 713/176 |
| 6,185,316 B1 | * | 2/2001 | Buffam | 382/100 |
| 6,202,073 B1 | * | 3/2001 | Takahashi | 345/620 |
| 6,259,801 B1 | * | 7/2001 | Wakasu | 382/100 |
| 6,314,192 B1 | * | 11/2001 | Chen et al. | 382/100 |
| 6,411,725 B1 | * | 6/2002 | Rhoads | 382/100 |
| 6,487,301 B1 | * | 11/2002 | Zhao | 382/100 |

* cited by examiner

Primary Examiner—Leo Boudreau
Assistant Examiner—Hussein Akhavannik
(74) Attorney, Agent, or Firm—Fitzpatrick, Cella, Harper & Scinto

(57) ABSTRACT

An image processing apparatus which can conveniently perform editing processing of image information based on template information and storage and output of the processing result is provided. In the apparatus, the image information used for template information storage is determined based on reference relation information which represents reference relation between the template information and the image information, and the determined image information is stored into an external storage unit together with the template information.

23 Claims, 12 Drawing Sheets

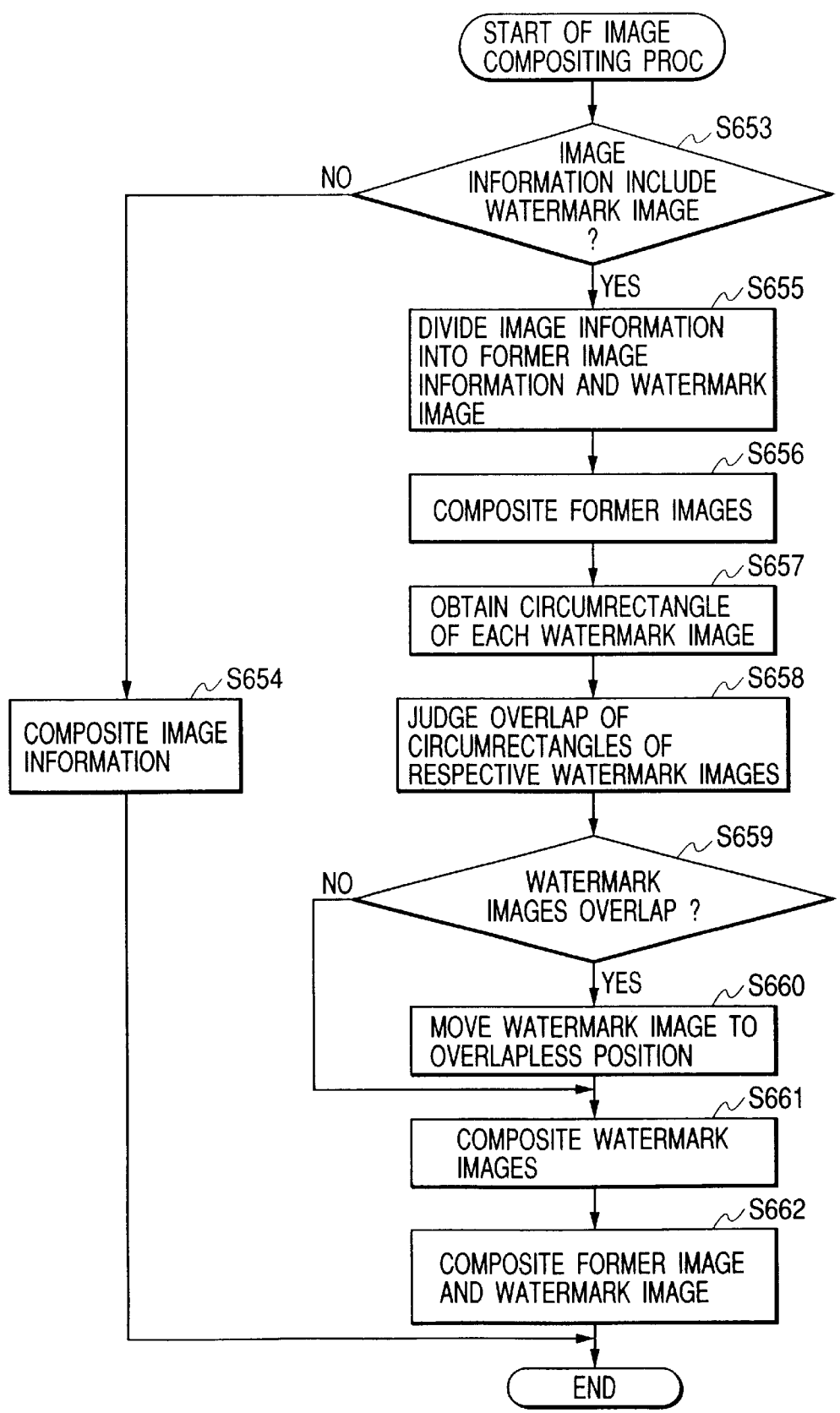

IMAGE PROCESSING APPARATUS, IMAGE PROCESSING METHOD AND STORAGE

BACKGROUND OF THE INVENTION

1. Field of the Invention

The present invention relates to, e.g., a technique for performing image processing by handling an image file, and more particularly to a technique for performing image editing processing on the basis of user's selection.

2. Related Background Art

Conventionally, there has been an image processing apparatus in which input image information is stored in a main storage unit, the stored image information is inlaid into a window of template information designated by a user, and then the obtained information is output. As images to be inlaid into the window, there are a material image always used in a template, an image took by a digital camera and to be printed, and the like.

In this image processing apparatus, the input image information and the template information can be stored into an external storage unit. Thus, the template information can be edited and output by loading the stored input image information and template information into the image processing apparatus. Of course, also the material image always used in the template can be stored in the external storage unit.

However, in the above-described conventional image processing apparatus, in a case where the template information is again edited and output by using the input image information and the template information both stored in the external storage unit, if the input image is erroneously deleted by the user, a case where the editing operation can not be performed is caused because the input image information and the material image data to be used together with the template information do not exist even in the external storage unit and the main storage unit either.

Further, in the above-described conventional image processing apparatus, there is a merit that the editing such as adjustment of the position and tint of each input image can be performed by using the template information and the input image information. However, it is difficult in this apparatus to repeat such the editing of the same content on, e.g., a next day.

Further, in the above-described conventional image processing apparatus, the image which was completed by the editing and compositing (or synthesizing) the various information can be stored so far. In such a case, since the image which is the composite result itself is stored, if the various information is again edited, it is necessary to composite the image information at the time of beginning.

Further, in a case where copyright information or the like has been recorded as an electronic watermark in the template or the input image, for example, if the plural input images are superposed for the editing and compositing, there is some fear that the electronic watermarks can not be recognized because these watermarks are also superposed.

SUMMARY OF THE INVENTION

An object of the present invention is to solve all or at least one of the above-described problems.

Another object of the present invention is to prevent a state that, since there is no image to be used in a template, editing is impossible.

Still another object of the present invention is to facilitate the editing to even an image obtained after it is composited (or synthesized) to the template.

In order to achieve these objects, according to the preferred embodiments of the present invention, it is disclosed an image processing apparatus comprising:

image editing means for editing predetermined template information and input image information; and reference relation storage means for storing reference relation information which represents reference relation (or reference) between the template information and the image information in the editing processing by the image editing means.

Still another object of the present invention is to enable to easily reproduce an image subjected to editing processing.

In order to achieve the object, according to the preferred embodiments of the present invention, the above-described image processing apparatus further comprises:

image input means for inputting the image information;

image information storage means for storing the image information input by the image input means;

template information storage means for storing the template information;

image output means for outputting the image information subjected to the editing processing by the image editing means; and storage means for storing the image information subjected to the editing processing by the image editing means, together with the template information used for the image information.

Still another object of the present invention is to enable to add an electronic watermark to even a composite image.

In order to achieve the object, according to the preferred embodiments of the present invention, the above-described image processing apparatus further comprises:

electronic watermark image information storage means for storing predetermined electronic watermark image information;

electronic watermark image information addition means for adding the electronic watermark image information to the image information subjected to the editing processing by the image editing means; and electronic watermark image information elimination means for eliminating the electronic watermark image information from the image information to which the electronic watermark image information has been added.

Still another object of the present invention is to prevent a state that, in case of compositing images, an electronic watermark can not be recognized.

In order to achieve the object, according to the preferred embodiments of the present invention, it is disclosed an image processing apparatus comprising:

input means for inputting plural image information each of which includes an electronic watermark;

compositing means for compositing plural images respectively represented by the plural image information; and control means for performing, when the compositing means composites the plural images, control such that, in a case where the electronic watermarks of the plural image information input by the input means overlap, each electronic watermark can be recognized.

Still another object of the present invention is to enable, even if there is no image subjected to editing processing, to reproduce the editing processing if there is template information.

In order to achieve the object, according to the preferred embodiments of the present invention, it is disclosed an image processing apparatus comprising:

image editing means for editing input image information and predetermined template information;

reference relation storage means for storing reference relation information which represents reference relation between the template information and the image information in the editing processing by the image editing means;

rendering means for compositing at least the two image information subjected to the editing processing based on the template information by the image editing means, to form one image information; and image composite information storage means for storing at least either of position information and composite method information concerning each image information being the target of the image compositing by the rendering means.

Still another object of the present invention is to provide an apparatus, a method and a medium which are more suitable to transmit and composite image information through a network.

Other objects and features of the present invention will become apparent from the following detailed description and the attached drawings.

BRIEF DESCRIPTION OF THE DRAWINGS

FIG. 13 is a flow chart for explaining composite processing of image information, in the second embodiment.

DETAILED DESCRIPTION OF PREFERRED EMBODIMENTS

First Embodiment

Hereinafter, the embodiment of the present invention will be explained with reference to the attached drawings.

Figure 1:
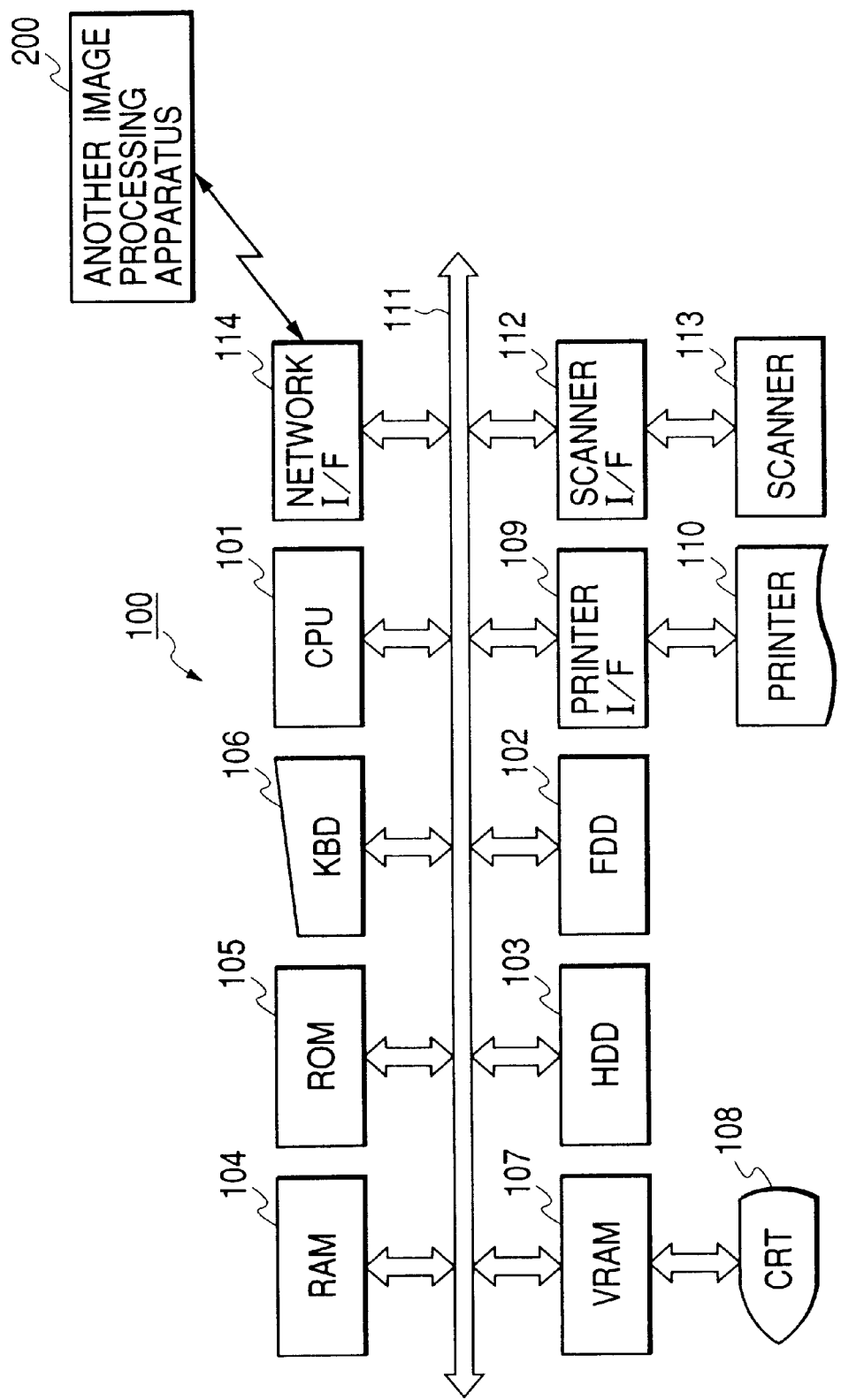
FIG. 1 is a block diagram showing a structure of an image processing apparatus according to first and second embodiments.

The present invention is applied to, e.g., an image processing apparatus 100 as shown in FIG. 1.

The image processing apparatus 100 has a function to perform editing processing to input image information on the basis of template information instructed by a user and output the edited image information. It should be noted that the user can register a desired material image in the template information itself. The material image may be prestored in the apparatus or input by the user.

The image processing apparatus 100 includes a CPU (central processing unit) 101 which controls an entire operation of the apparatus 100, an FDD (floppy disk drive) 102 which is an external storage unit for storing various information, an HDD (hard disk drive) 103 which is a main storage unit for storing the image information and the template information, a RAM (random access memory) 104 into/from which various data are written/read when the template information is stored and when a printing operation is performed, a ROM (read-only memory) 105 which stores processing programs of the template information storage processing and the printing operation, a KBD (keyboard) 106 which inputs various data and user's instructions, a VRAM (video RAM) 107 which stores image display data, a printer I/F (interface) 109, a scanner I/F 112, and a network I/F 114. The data are transferred among these units through a bus 111.

A CRT (cathode ray tube) 108 which displays images, an operation panel and the like is connected to the VRAM 107, a printer 110 which prints and outputs images is connected to the printer I/F 109, a scanner 113 which inputs images is connected to the scanner I/F 112, and another image processing apparatus 200 is connected to the network I/F 114 through a network.

Figure 2:
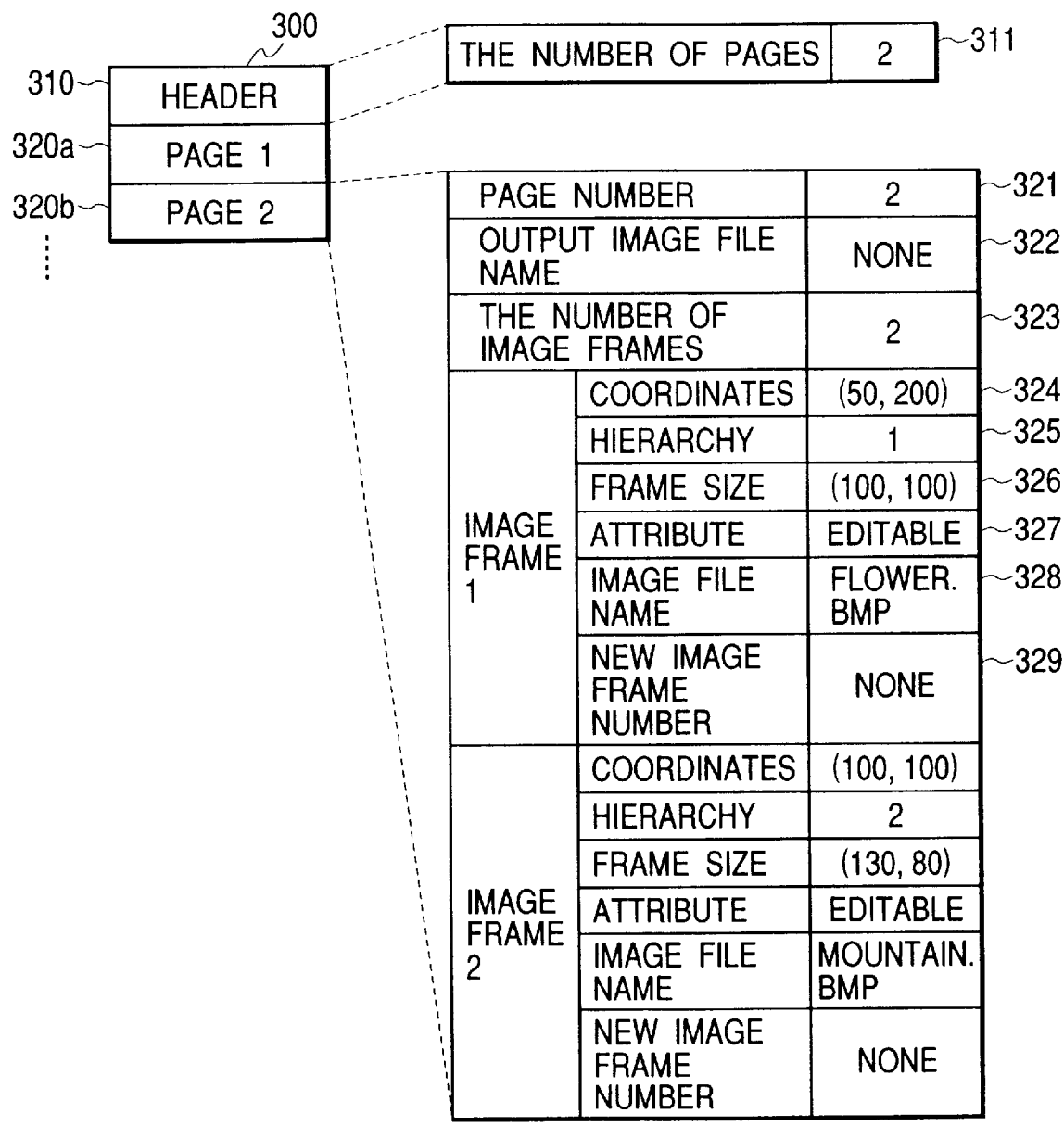
FIG. 2 is a view for explaining a data structure of template information in the first and second embodiments.

FIG. 2 shows a structure (i.e., data format) of template information 300 used in the image processing apparatus 100. The template information 300 in the present embodiment represents, e.g., a later-described template image shown in FIG. 3.

The template information 300 is stored in, e.g., the HDD 103 (or the FDD 102), and includes one header information 310 and plural page information 320a, 320b, —as shown in FIG. 2.

The header information 310 includes information 311 which represents the number of pages. For example, if there are the two page information 320a and 320b, the number of pages "2" is stored as the information 311.

The page information 320a, 320b, —have the identical structure. Namely, the information corresponding to each page to be printed is stored as each of these page information. Concretely, for example, page number information 321, output image file name information 322, and information 323 representing the number of image frames (windows) included in the template are stored as the page information 320a. Also, image frame position information 324, hierarchy information 325, size information 326, attribute information 327, file name information 328 of the image information to be inserted, and new image frame number information 329 are stored for each image frame. In this case, it is assumed that the information for each of two image frames 1 and 2 are stored. In the present embodiment, although the information 328 is the file name information, it may be information representing an image to which the template refers. For example, the information 328 may be URL (uniform resource locator) information or the like.

The image frame position information 324 is the information which represents the lower-left corner position of the image frame with coordinates in which the lower-left corner of the page is used as a starting point.

The hierarchy information 325 of the image frame is the information which represents the frame existing interiorly for the page with based numeric information. As the numeral of the based numeric information is larger, the image frame is output more forward.

The size information 326 of the image frame is the information which represents the rectangle size of the image frame.

The attribute information 327 of the image frame is the information which represents permission/nonpermission (or editable/noneditable) of insertion of the image information input by the scanner (image input unit) 113.

That is, for example, if the image of which image file name is "FLOWER.BMP" as shown in the information 328 of FIG. 2 is registered as a material image which is always used by the template and thus the image "FLOWER.BMP" is not substituted by another image, the attribute information 327 is set to be "nonpermission". Conversely, if it is permitted to inlay (or inset) the input image such that the image "FLOWER.BMP" is substituted by another image, the attribute information 327 is set to be "permission".

If the image information of the image frame has been already composited (or synthesized) to image information of another image frame to generate the composite image information as new image information, the image frame number of the new image information is set to the new image frame number information 329. Thus, the information 329 is used as image information composite information.

For example, if the attribute information 327 of the images of both the image frames 1 and 2 shown in FIG. 2 are "nonpermission", it is permitted to collect these two images together into one image because they are not edited. For this reason, these two images are composited and stored. In this connection, if these two images have an overlap area, the quantity of the data to be stored can be reduced by the quantity corresponding to the data of the image hidden below, as compared with a case where these two images are stored without compositing them. When these two images are composited, in order to consider these two images together as the image frame 1, the information which represents that the image frame 2 is gathered in the image frame 1 has been input as the new image frame number information 329 of the image frame 2.

On the other hand, if the image information of such the image frame is not composited (or synthesized) to the image information of another image frame, nothing is set to the new image frame number information 329. For this reason, when the image frame number has been set to the new image frame number information 329, the image information (i.e., image information before it is composited) of the image frame of the set image frame number is not used in ordinary image frame displaying.

Further, if the image information is not inserted into such the image frame, the file name information 328 of the image information is not set.

Figure 3:
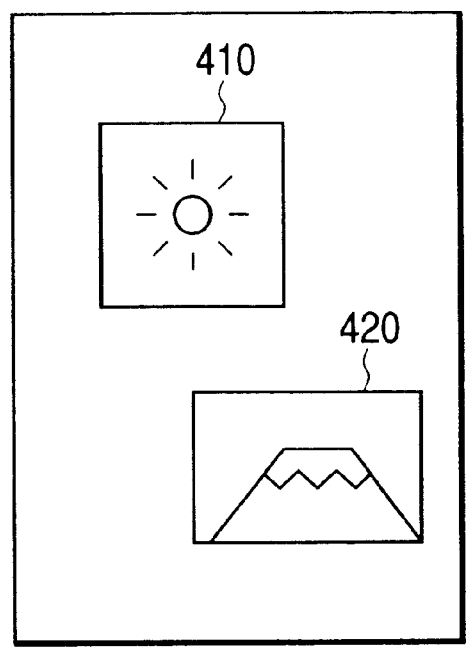
FIG. 3 is a view for explaining a state that input image data is edited based on the template information.

FIG. 3 shows the result (i.e., output image) obtained when the input image information is edited on the basis of the template information 300 shown in FIG. 2.

In FIG. 3, numeral 410 denotes the image frame 1 of the template information 300, and numeral 420 denotes the other image frame 2. The image information inlaid or inserted in these image frames are represented by the image information input from the scanner 113 or the like.

Figure 4:
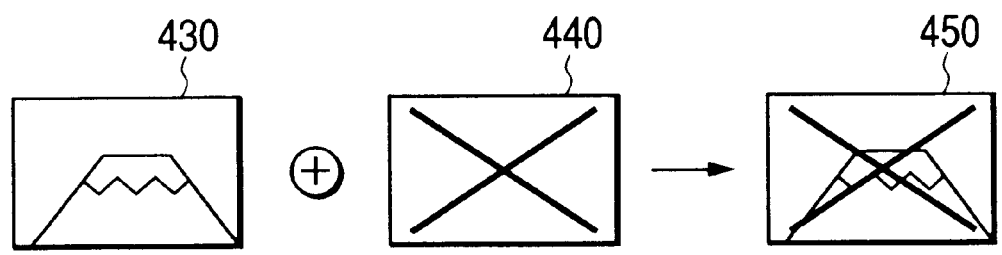
FIG. 4 is a view for explaining an electronic watermark processing function in the first embodiment.

FIG. 4 shows the principle of the electronic watermark.

The image processing apparatus has an electronic watermark processing function.

The electronic watermark is the means which is used to prevent that the image information is diverted from its original purpose to another purpose. That is, as shown in FIG. 4, predetermined image information (also called as "watermark image information") 440 such as information representing an attribute of original image information 430 is mixed into the information 430 to generate image information (also called as "watermark-added image information") 450, and the generated information 450 is stored in a storage unit. Thus, for example, by visibly clarifying that the image information was diverted, effectively it is restrain or preferably inhibit that the image is diverted. Incidentally, various kinds of electronic watermarks have been known. For example, to form the electronic watermark, a visible image is composited, watermark image information is embedded in an image after orthogonal transformation, or watermark image information is embedded at the edge portion of an image. Any of these electronic watermarks can be used.

In the present embodiment, it is assumed that such the means includes the means which eliminates the image information 440 mixed into the watermark-added image information 450 in a predetermined method, from the information 450, so as to restore the original image information 430.

In the image processing apparatus 100, the watermark image information previously stored in the HDD (main storage unit) 103 is XOR (exclusive OR) calculated and then embedded in the original image information to generate the watermark-added image information.

Further, the watermark image information in the watermark-added image information is again XOR calculated to restore the original image information.

Although the method to realize the electronic watermark in the present embodiment is the method to composite and mix the watermark image information to the original image information by XOR calculation, the present invention is not limited to this. Namely, another image processing means may be used.

Hereinafter, operations in setting, storage processing and print processing of the template information which are performed by the image processing apparatus 100 having such the structure as above will be explained with reference to flow charts shown in FIGS. 5, 6 and 7.

Figure 5:
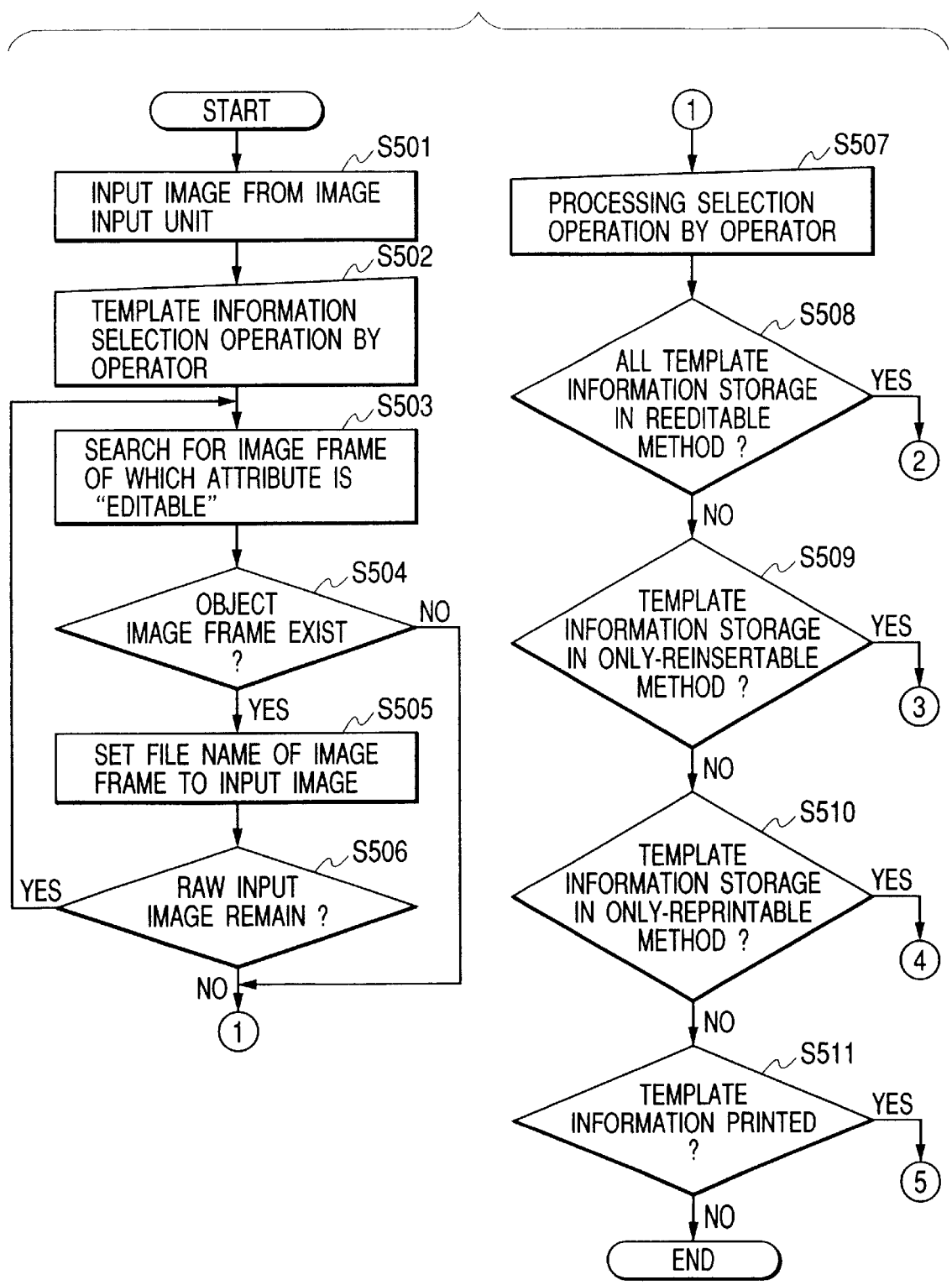
FIG. 5 is a flow chart for explaining template information storage processing and print processing in the first embodiment.

In FIG. 5, steps S501, S502, S503, S504, S505 and S506 represent processing to perform the setting of the template information 300 of FIG. 2. For example, the setting for the processing to composite the template information and the input image is performed in the flow chart of FIG. 5, and it is assumed that this processing is performed in each page. If the number of input images can not be entered within one page of the template, a next page of the template is added, and the processing in the steps S501 to S506 continues.

(Step S501)

The image information obtained by the scanner (image input unit) 113 is input through the scanner I/F 112. The input image information is added with the file name (e.g., "FLOWER.BMP", "MOUNTAIN.BMP", or the like), and once stored into the HDD 103.

It should be noted that an image input through a network or image information stored in the FDD 102 may be used as the input image information.

(Step S502)

In accordance with the working from the user by the KBD 106, the corresponding template information (i.e., the template information desired by the user) is selected from among the template information previously stored in the HDD 103.

(Step S503)

On the basis of the attribute information (see FIG. 2) of the image frame information of each page information included in the template information selected in the step S502, the image frame which permits the input image information to be inserted there (also called as "editable image frame") is searched.

(Step S504)

On the basis of the searched result in the step S503, it is judged whether or not the image frame which permits the input image information to be inserted exists.

(Step S505)

If judged in the step S504 that the image frame which permits the input image information to be inserted exits, in order to insert the input image information stored into the HDD 103 in the step S501 into the information of such the image frame (i.e., the image file name information 328 shown in FIG. 2), the file name of such the input image information is set.

Thus, for example, as shown in FIG. 2, the file name "FLOWER.BMP" of the input image information is stored as the image file name information 328 of the image frame 1 for the page information 320*b*.

(Step S506)

It is judged whether or not raw input image information (i.e., the input image information not processed yet) exists.

If judged that the raw input image information exists, the flow returns to the step S503 to perform the processing in the steps S503 to S505 for next input image information. Conversely, if judged that the raw input image information does not exist, i.e., if the setting of the template information in the steps S503 to S505 for all the input image information ends, the flow advances to a next step S507. It should be noted that, in the setting of the template information, the file name of the input image which is to be inlaid in each image frame of the template selected by the operator is set.

Subsequently, the flow chart for the storing and printing of the template information will be explained.

(Step S507)

If it is instructed by the working from the user with the KBD 106 to store the template information, the operation panel is displayed on the CRT 108, thereby asking the user to select and instruct a storage method of the template information.

(Step S508)

If the user selects and instructs the storage method of the template information in the step S507, then it is judged whether or not such an instruction is the instruction to store the template information in a storage method that all reediting operations are possible (also called as "reeditable storage method").

Figure 6:
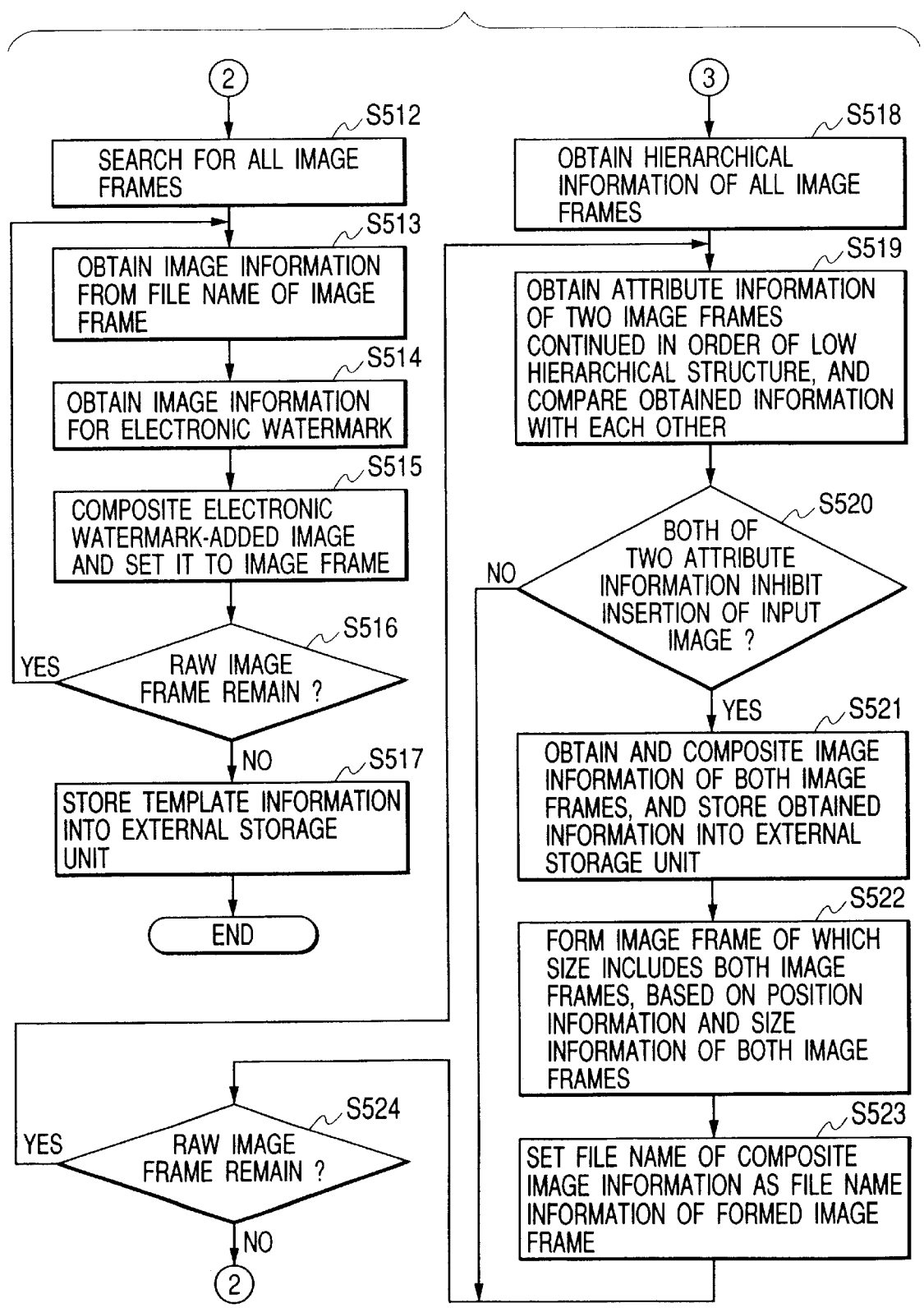
FIG. 6 is a flow chart for explaining processing to be performed in a case where it is instructed to store the template information in a storage method that all reediting operations can be performed or in a storage method that only input image information inserted into an image frame can be edited, in the first embodiment.

If judged that the instruction is to store the template information in the storage method that all the reediting operations are possible, the flow advances to a step S512 (FIG. 6). In the storage method that all the reediting operations are possible (or in the reeditable storage method), the template information is stored in the state that the attribute information 327 of all the image frames represent "editable", that there is no new image frame number, and that arbitrary editing and designation of the image to be inserted are possible for all the frames.

(Step S509)

If judged in the step S508 that the instruction is not to store the template information in the storage method that all the reediting operations are possible, then it is judged whether or not such the instruction is the instruction to store the template information in a storage method that the editing operation to only reinsert the input image information inserted in the image frame is possible (also called as "only-reinsertable storage method"). In the storage method that the editing operation to only reinsert the input image information, in the case where the previously described material image data is registered, the image can be inserted into only the frame of which attribute is "permission".

If judged that such the instruction is to store the template information in the storage method that the editing operation to only reinsert the input image information is possible, the flow advances to a step S518 (FIG. 6).

(Step S510)

If judged in the step S509 that such the instruction is not to store the template information in the storage method that the editing operation to only reinsert the input image information is possible, then it is judged whether or not such the instruction is the instruction to store the template information in a storage method that only reprinting is possible (also called as "only-reprintable storage method"). In the storage method that only the reprinting is possible, the input image is stored in the state that this image is being inserted in the template, whereby another image can not be inserted into such a frame.

Figure 7:
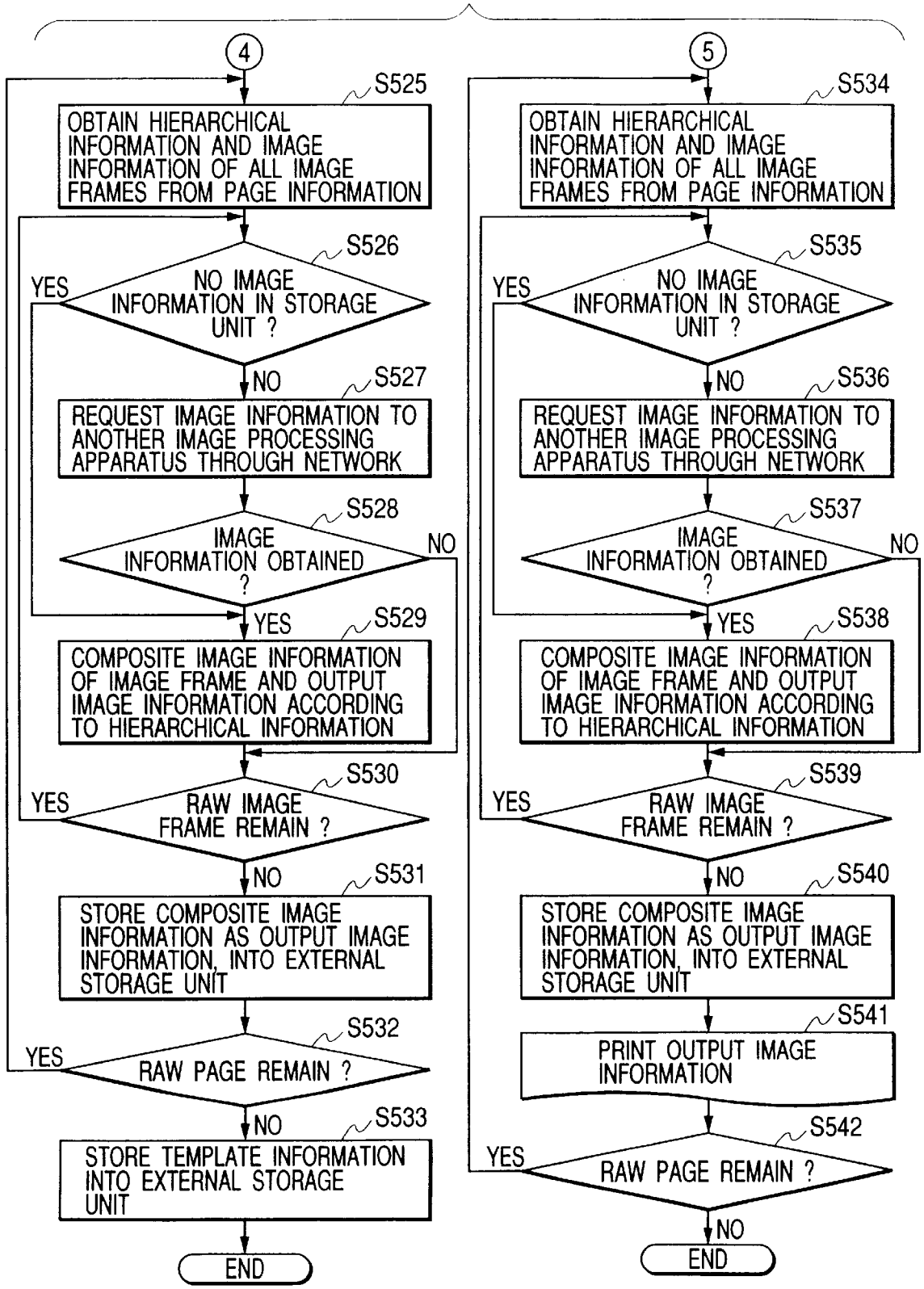
FIG. 7 is a flow chart for explaining processing to be performed in a case where storage of the template information in a storage method that only reprint can be performed is instructed or print output of the template information is instructed, in the first embodiment.

If judged that such the instruction is to store the template information in the storage method that only the reprinting is possible, the flow advances to a step S525 (FIG. 7).

(Step S511)

If judged in the step S510 that such the instruction is not to store the template information in the storage method that only the reprinting is possible, then it is judged whether or not such the instruction is the instruction to output and print the template information.

If judged that such the instruction is to output and print the template information, the flow advances to a step S534 (FIG. 7).

Conversely, if judged that such the instruction is not to output and print the template information, i.e., if such the instruction does not correspond to either of the instructions in the steps S508 to S511, the processing ends.

(Step S512)

If judged in the step S508 that the instruction is to store the template information in the storage method that all the reediting operations are possible, then the processing in the steps S512, S513, S514, S515, S516 and S517 are performed.

That is, first, all the image frame information are searched in each page information of the template information, and the processing in the sequential steps S513 to S515 is performed to the searched image frame information.

(Step S513)

The file name information in the object image frame information is obtained, and the image information having such the file name is obtained from the HDD 103.

(Step S514)

The watermark image information is obtained from the HDD (main storage unit) 103. In this case, it is assumed that a method to embed the watermark image information in a redundant portion of the image by using orthogonal transformation is applied. According to such the method, it is possible to embed an image in another image such that the embedded image is indistinctive for human eyes. However, the present embodiment is not limited to this. Namely, it is possible to use a visible electronic watermark which is distinctive for human eyes.

(Step S515)

When the input image information obtained in the step S513 and the watermark image information obtained in the step S514 are composited, e.g., when the visible electronic watermark and the input image are composited, such the compositing is performed by XOR calculation, thereby generating the watermark-added image information. Then the watermark-added image information is stored into the FDD (external storage unit) 102.

(Step S516)

It is judged whether or not the generating and storing of the watermark-added image information into the FDD 102 end for all the image frame information of the template information.

If judged that the generating and storing do not end yet, the flow returns to the step S513 to perform the processing in the steps S513 to S515 for the next image frame information.

(Step S517)

If judged in the step S516 that the generating and storing end for all the image frame information, the template information after such the processing is added to the template information before the processing or the input image, and the obtained information is stored into the FDD (external storage unit) 102. Then the processing ends.

After the processing, new another image can be inserted into each image frame of the stored template, when each image frame is next captured by the image processing apparatus.

(Step S518)

If judged in the step S509 that such the instruction from the user is to store the template information in the storage method that the editing operation to only reinsert the input image information inserted in the image frame is possible, the processing in the steps S518, S519, S520, S521, S522, S523 and S524 is performed, and then the above-described processing in the steps S512, S513, S514, S515, S516 and S517 is performed.

That is, hierarchical information of all the image frame information is first obtained from the page information of the template information.

(Step S519)

Attribute information of the two continuous image frame information are obtained in the order of lower value, and comparison of these information obtained is performed.

(Step S520)

Based on the compared result in the step S519, it is judged whether or not both of the two attribute information are the information not to permit the insertion of the input image information.

If judged that the two attribute information are not the information not to permit the insertion of the input image, the flow advances to the later-described step S524.

(Step S521)

If judged in the step S520 that the two attribute information are the information not to permit the insertion of the input image information, the two image frames respectively corresponding to the two attribute information are composited to generate one image frame.

Namely, the file name information of both the image frames are obtained, and the input image information having these file names are obtained from the HDD 103. Then these input image information are composited to generate the composite image information (i.e., rendering processing), and the generated composite image information is stored as the image file into the HDD 103.

(Step S522)

Further, the position information and the size information of the two image frames are obtained, and a minimum image frame including these two image frames is newly formed.

(Step S523)

The file name of the composite image information obtained in the step S521 is set to the template information as the file name information of the image file newly formed in the step S522. In the embodiment, since it is unnecessary to redundantly store the data of the image overlapping portion, whereby it is possible to reduce the quantity of the image data.

(Step S524)

It is judged whether or not the processing of the steps S519 to S523 ends for all the image frames.

If judged that the processing does not end for all the image frames, the flow returns to the step S519 to perform the processing in the steps S519 to S523 for the next image frame. Conversely, if judged that the processing ends, the flow advances to the step S512 to perform the processing in the steps S513 to S517.

It should be noted that, since the processing in the steps S512 to S517 is the same as that in the case where it is instructed to store the template information in the storage method that all the reediting operations are possible, the detailed explanation thereof is omitted.

(Step S525)

If judged in the step S510 that the user's instruction is to store the template information and the input image information in the storage method that only the reprinting is possible, then the processing in the steps S526, S527, S528, S529, S530, S531 and S532 is performed for each page information of the template information. After then, the above-described processing in the steps S512 to S517 is performed. In FIG. 7, it is assumed that the processing in the steps S512 to S517 is performed in a step S533.

That is, first, the hierarchical information of each image frame of the image information is obtained, and also the input image information corresponding thereto is obtained from the HDD 103.

(Step S526)

It is judged whether or not the input image information is obtained in the processing in the step S525, i.e., it is judged whether or not the input image information corresponding to the image frame exists in the HDD 103 for each image frame. In the case where the input image information has been stored in the FDD 102, it is judged whether or not the corresponding input image information exists in the FDD 102.

If judged that the input image information corresponding to the object image frame exists in the HDD 103, the flow advances to the later-described step S529.

(Step S527)

If judged in the step S526 that the input image information does not exist in the HDD 103, the information (i.e., the image file name information of the image frame in the step S525) of the file name of the object image information is transmitted to another image processing apparatus 200 through the network I/F 114, thereby performing communication to request the input image information.
(Step S528)

It is judged whether or not the input image information can be obtained as a result of the judgment in the step S525.

If judged that the input image information can not be obtained, the flow advances to the later-described step S530.
(Step S529)

If judged in the step S528 that the input image information can be obtained in the communication, or if judged in the step S526 that the input image information exists in the HDD 103, the input image information is composited in the order of lower value in accordance with the contents of the hierarchical information of the page information of the template information, thereby generating output image information.
(Step S530)

It is judged whether or not the image compositing processing in the steps S526 to S529 ends for all the image frames.

If judged in the step S528 that the input image information is not transmitted from another image processing apparatus 200, the image compositing processing in the step S529 is not performed, and the judgment processing in the step S530 is directly performed.

If judged that the image compositing processing does not end for all the image frames, the flow returns to the step S526 to perform the processing in the steps S526 to S529 for the next image frame.
(Step S531)

If judged in the step S530 that the image compositing processing ends for all the image frames, then the file name of the output image information generated in the step S529 is set to the output image file name information of the object page information, and the obtained information is stored into the HDD 103. It should be noted that, like the processing in the steps S514 to S515, the electronic watermark compositing processing is simultaneously performed at this time.
(Step S532)

It is judged whether or not the storing of the output image information in the steps S525 to S531 ends for all the page information.

If judged that the storing does not end, the flow returns to the step S525 to perform the processing in the steps S525 to S531 for the next page information.
(Step S533)

If judged in the step S532 that the storing of the output image information ends for all the page information, like the step S517, also the template information is stored into the HDD 103.

After then, the processing ends.
(Steps S534, S535, S536, S537, S538, S539 and S540)

If judged in the step S511 that the instruction from the user is to output and print the template information, the processing in the steps S534 to S540 which is substantially the same as the above-described processing in the steps S525 to S531 is performed, and subsequently the processing in the steps S541 and S542 is performed.

That is, the hierarchical information of each image frame and the input image information corresponding thereto are obtained on the basis of each page information of the template information (step S534). If judged that the input image information does not exist in the HDD 103 or the FDD 102 (step S535), the file name information of the input image information is transmitted to another image processing apparatus 200 through the network I/F 114, thereby performing communication to request the input image information (step S536). Then, if the input image information is transmitted from another image processing apparatus 200 through the network I/F 114 (step S537), the input image information is composited in the order of lower value of the contents of the hierarchical information, thereby generating the output image information (step S538). Conversely, if the input image information is not transmitted from another image processing apparatus 200, the image information compositing processing for the image frame is not performed. After the image compositing processing ends for all the image frames (step S539), the file name of the generated output image information is set to the output image file name information of the object page information (step S540).
(Step S541)

The output image information generated in the step S538 is output and printed from the printer 110 through the printer I/F 109.
(Step S542)

It is judged whether or not the printing of the output image information in the steps S534 to S541 ends for all the page information.

If judged that the printing does not end, the flow returns to the step S534 to perform the processing in the steps S534 to S542 for the next page information.

Conversely, if judged that the printing of the output image information ends for all the page information, then the processing ends.

As explained above, according to the present embodiment, when the template information is stored into the external storage unit or the like, it is possible to store, together with this template information, the information representing the reference relation (or reference) between such the information and the image information used for this template information.

Further, if it is structured that, among the image information to be stored, the plural image information are composited and stored as the collected-image information into the external storage unit or the like, it is possible to reduce the storage capacity which is necessary to store the template information into the external storage unit or the like. In this case, it should be noted that, since also the images after the collection are linked to the template by the information representing the reference relation, it is possible to easily edit them by using the template as it is.

Further, if electronic watermark image information is composited (or added) to the image information to be stored and then such the watermark-added image information is stored into the external storage unit or the like, it is possible to prevent that the image information is diverted to other purposes.

Further, when the stored template information is reedited (or edited again), it is possible to obtain the necessary image information from another apparatus through the network to generate the output image information. Therefore, it is possible to prevent that the editing processing can not be performed because the image data is not stored in the storage unit.

Second Embodiment

As described in the first embodiment, when plural images are composited, there is a case where the two image respectively added with electronic watermarks are composited, or a case where the image in which the image added with an electronic watermark has been composited is further added with an electronic watermark. Especially, if the images having various-types of electronic watermarks are input through a network, the electronic watermarks themselves tend to overlap.

The second embodiment is provided by further developing the first embodiment. Particularly, the object of the present embodiment is to prevent that the electronic watermarks can not be recognized because these watermarks overlap.

Figure 8A:
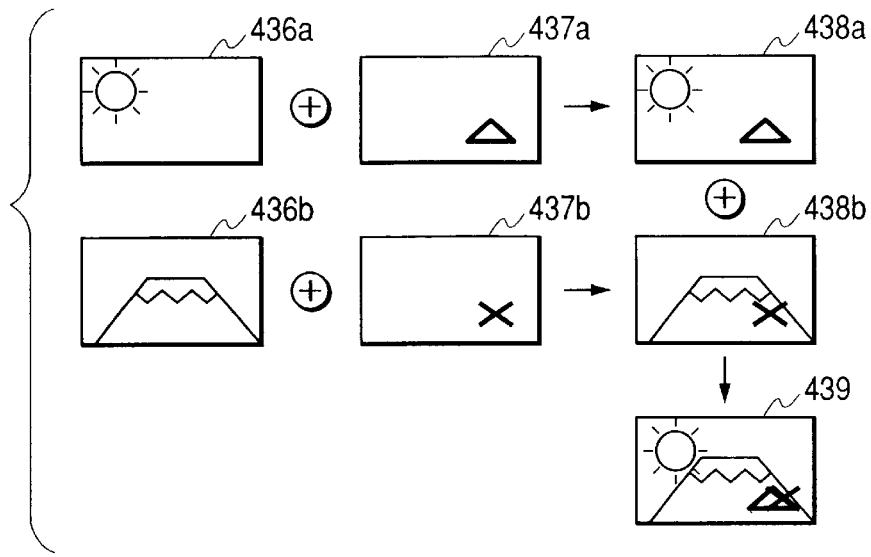
FIGS. 8A and 8B are views for explaining an electronic watermark processing function in the second embodiment.
Figure 8B:
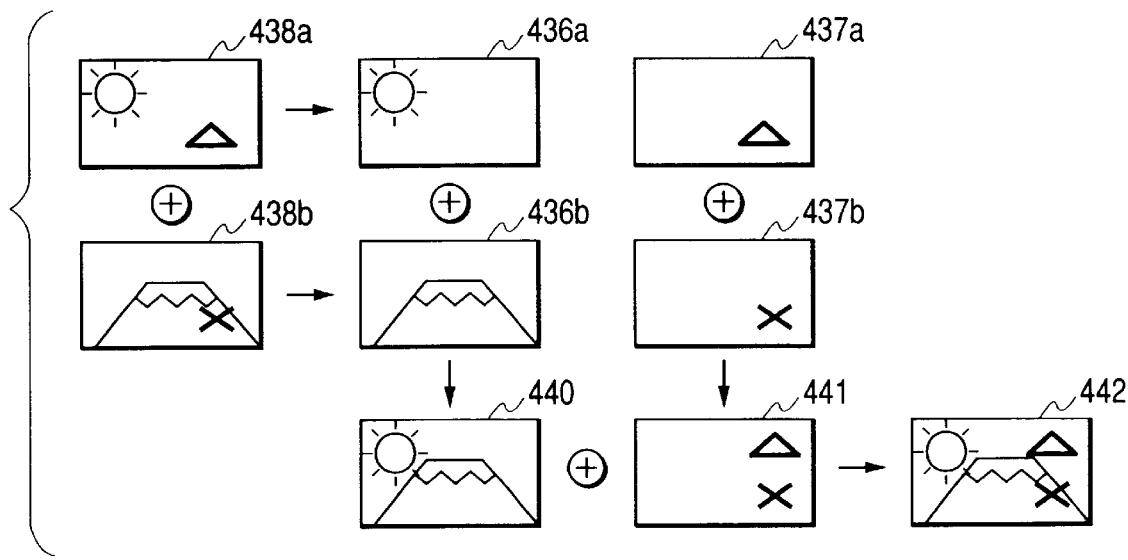

FIGS. 8A and 8B are views for explaining the principle of electronic watermark processing in the present embodiment, and the processing that image information added with an electronic watermark is composited to another image information also added with an electronic watermark.

In the image processing apparatus 100, the CPU 101 has a function to edit the images, a function to insert or add the electronic watermark, a function to delete or erase the electronic watermark, and a function to control the rendering processing. In addition, the CPU 101 has a function to composite the two electronic watermarks, a function to obtain a circumrectangle of the electronic watermark, and a function to discriminate or judge overlap of the plural circumrectangles.

Further, the image information and the template information are stored in the HDD 103. In addition, the electronic watermark image information, the information concerning the position and compositing method of the electronic watermark in case of compositing the two electronic watermarks, and the like are stored in the HDD 103.

The electronic watermark is the means which is used to prevent that the image information is diverted from its original purpose to another purpose. For example, as shown in FIG. 8A, predetermined image information ("Δ" (triangular shape) in this case, and also called as "watermark image information") 437a is mixed into original or former image information 436a to generate image information (also called as "watermark-added image information") 438a, and the generated image information 438a is stored in a storage unit, whereby the image information can not be visibly diverted, or the source of the image information is clarified. Further, this means further includes the means which erases the watermark image information 437a from the watermark-added image information 438a in which the information 437a has been mixed in a predetermined method so as to restore the original image information 436a. It is assumed that, in the electronic watermark image information of the present embodiment, the value of luminance to be changed is given to a predetermined-shape area.

In the image processing apparatus 100, the watermark image information previously stored in the HDD (main storage unit) 103 is XOR calculated and then embedded in the original image information to generate the watermark-added image information.

Further, the watermark image information in the watermark-added image information is again XOR calculated to restore the original image information.

Although the method to realize the electronic watermark is the method to composite and mix the watermark image information to the original image information by XOR calculation, the present embodiment is not limited to this. Namely, another image processing means may be used. In this case, if the watermark image information is composited to the original image information by XOR calculation, the respective watermarks can not be recognized when the plural watermarks overlap. The present embodiment copes with such a inconvenience by shifting respective positions to which the watermarks are embedded.

That is, as shown in FIG. 8A, conventionally, when the watermark-added image information 438a in which the watermark image information 437a is mixed into original image information 436b and watermark-added image information 438b in which watermark image information 437b is mixed into the original image information 436b are composited, thus obtained composite image information 439 represents a state that the watermark image information 437a and the watermark image information 437b overlap. For this reason, it is impossible to discriminate the watermark image information 437a from the watermark image information 437b.

Therefore, as shown in FIG. 8B, when the watermark-added image information 438a in which the watermark image information 437a is mixed and the watermark-added image information 438b in which the watermark image information 437b is mixed are composited, the watermark-added image information 438a is first divided into the original image information 436a and the watermark image information 437a. Similarly, the watermark-added image information 438b is divided into the original image information 436b and the watermark image information 437b.

Next, the original image information 436a and the original image information 436b are composited to obtain composite image information 440.

Further, the watermark image information 437a and the watermark image information 437b are composited to obtain composite watermark image information 441. At this time, for example, a circumrectangle of each of the watermark image information 437a and the watermark image information 437b is detected and edited such that the information 437a and the information 437b do not overlap.

Then the composite image information 440 and the composite watermark image information 441 are composited to obtain composite image information 442.

In the present embodiment, by such the image compositing processing as described above, as the watermark image information 437a mixed into the watermark-added image information 438a and the watermark image information 437b mixed into the watermark-added image information 438b are respectively held in distinguishable states, it is possible to composite the watermark-added image information 438a and the watermark-added image information 438b.

Hereinafter, operations in the template information storage processing and print processing which are performed by the image processing apparatus 100 having such the structure as above will be explained with reference to FIGS. 9, 10, 11, 12 and 13.

It should be noted that the following explanations include the parts common to those in FIGS. 5 to 7. Further, it is possible to substitute the following explanations of the respective steps for the explanations of the corresponding steps shown in FIGS. 5 to 7.

Figure 9:
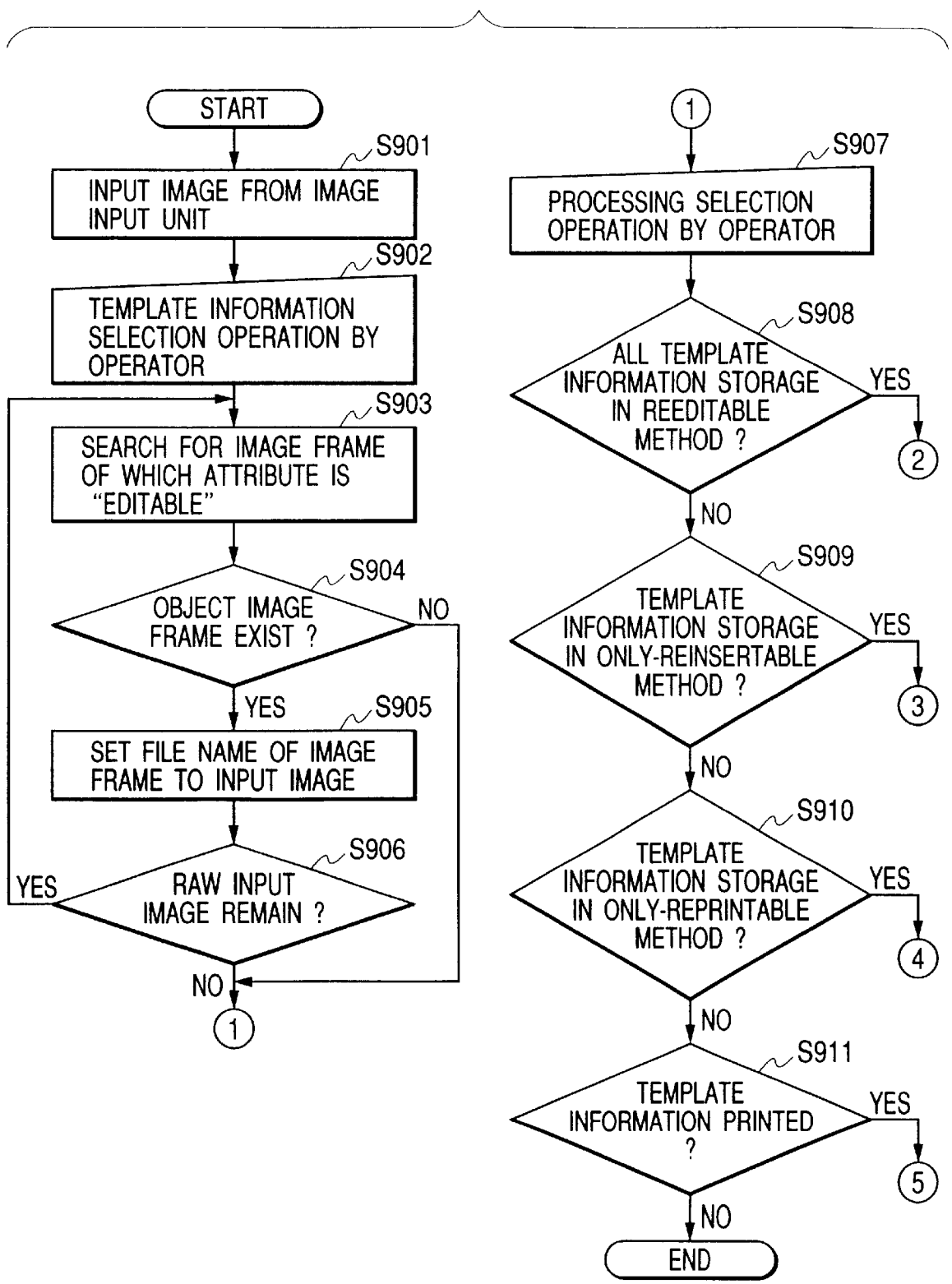
FIG. 9 is a flow chart for explaining template information storage processing and print processing in the second embodiment.

Like the steps S501 to S506 in FIG. 5, steps S901, S902, S903, S904, S905 and S906 in FIG. 9 represent the processing to perform the setting of the template information 300 of FIG. 2.

(Step S901)

The image information obtained by the scanner (image input unit) 113 is input through the scanner I/F 112. The input image information is added with the file name (e.g., "FLOWER.BMP", "MOUNTAIN.BMP", or the like), and once stored into the HDD 103.

It should be noted that an image input through a network or image information stored in the FDD 102 may be used as the input image information.

(Step S902)

In accordance with the working from the user by the KBD 106, the corresponding template information (i.e., the template information desired by the user) is selected from among the template information previously stored in the HDD 103.

(Step S903)

On the basis of the attribute information (see FIG. 2) of the image frame information of each page information included in the template information selected in the step S902, the image frame which permits the input image information to be inserted there (also called as "editable image frame") is searched.

(Step S904)

On the basis of the searched result in the step S903, it is judged whether or not the image frame which permits the input image information to be inserted exists.

(Step S905)

If judged in the step S904 that the image frame which permits the input image information to be inserted exits, in order to insert the input image information stored into the HDD 103 in the step S901 into the information of such the image frame, the file name of such the input image information is set.

Thus, for example, as shown in FIG. 2, the file name "FLOWER.BMP" of the input image information is stored as the image file name information 328 of the image frame 1 for the page information 320b.

(Step S906)

It is judged whether or not raw input image information (i.e., the input image information not processed yet) exists.

If judged that the raw input image information exists, the flow returns to the step S903 to perform the processing in the steps S903 to S905 for next input image information. Conversely, if judged that the raw input image information does not exist, i.e., if the setting of the template information in the steps S903 to S905 for all the input image information ends, the flow advances to a next step S907.

Next, the flow chart for the storing and the printing of the template information will be explained.

(Step S907)

If it is instructed by the working from the user with the KBD 106 to store the template information, the operation panel is displayed on the CRT 108, thereby asking the user to select and instruct the method for storing the template information.

(Step S908)

If the user selects and instructs the storage method of the template information in the step S907, then it is judged whether or not such an instruction is the instruction to store the template information in the storage method that all reediting operations are possible (also called as "reeditable storage method").

Figure 10:
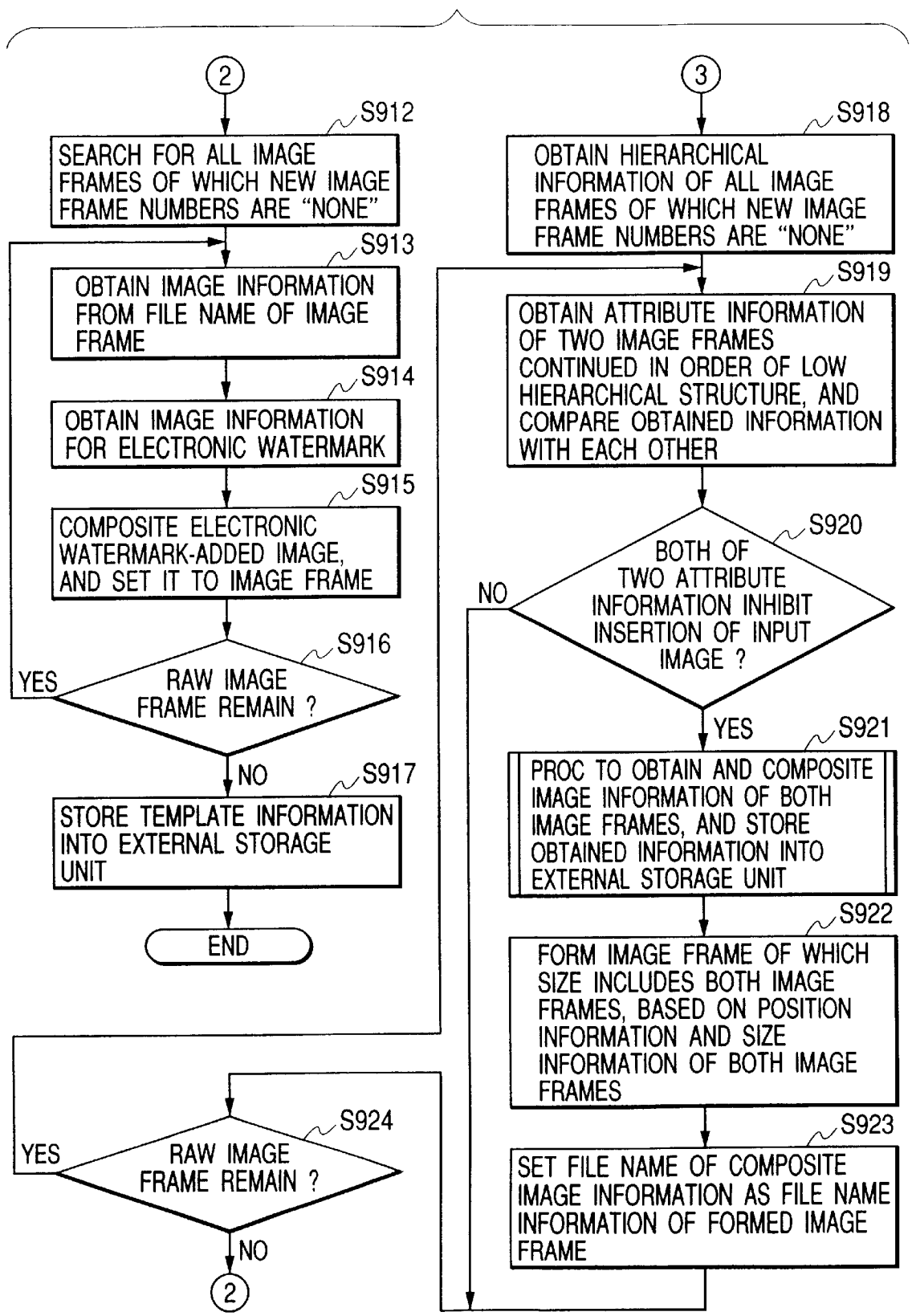
FIG. 10 is a flow chart for explaining processing to be performed in a case where it is instructed to store the template information in a storage method that all reediting operations can be performed or in a storage method that only input image information inserted into an image frame can be edited, in the second embodiment.

If judged that the instruction is to store the template information in the reeditable storage method, the flow advances to a step S912 (FIG. 10).

(Step S909)

Conversely, if judged in the step S908 that the instruction is not to store the template information in the reeditable storage method, then it is judged whether or not such the instruction is the instruction to store the template information in the storage method that the editing operation to only reinsert the input image information inserted in the image frame is possible (also called as "only-reinsertable storage method").

If judged that such the instruction is to store the template information in the only-reinsertable storage method, the flow advances to a step S918 (FIG. 10).

(Step S910)

If judged in the step S909 that such the instruction is not to store the template information in the only-reinsertable storage method, then it is judged whether or not such the instruction is the instruction to store the template information in a storage method that only reprinting is possible (also called as "only-reprintable storage method").

Figure 11:
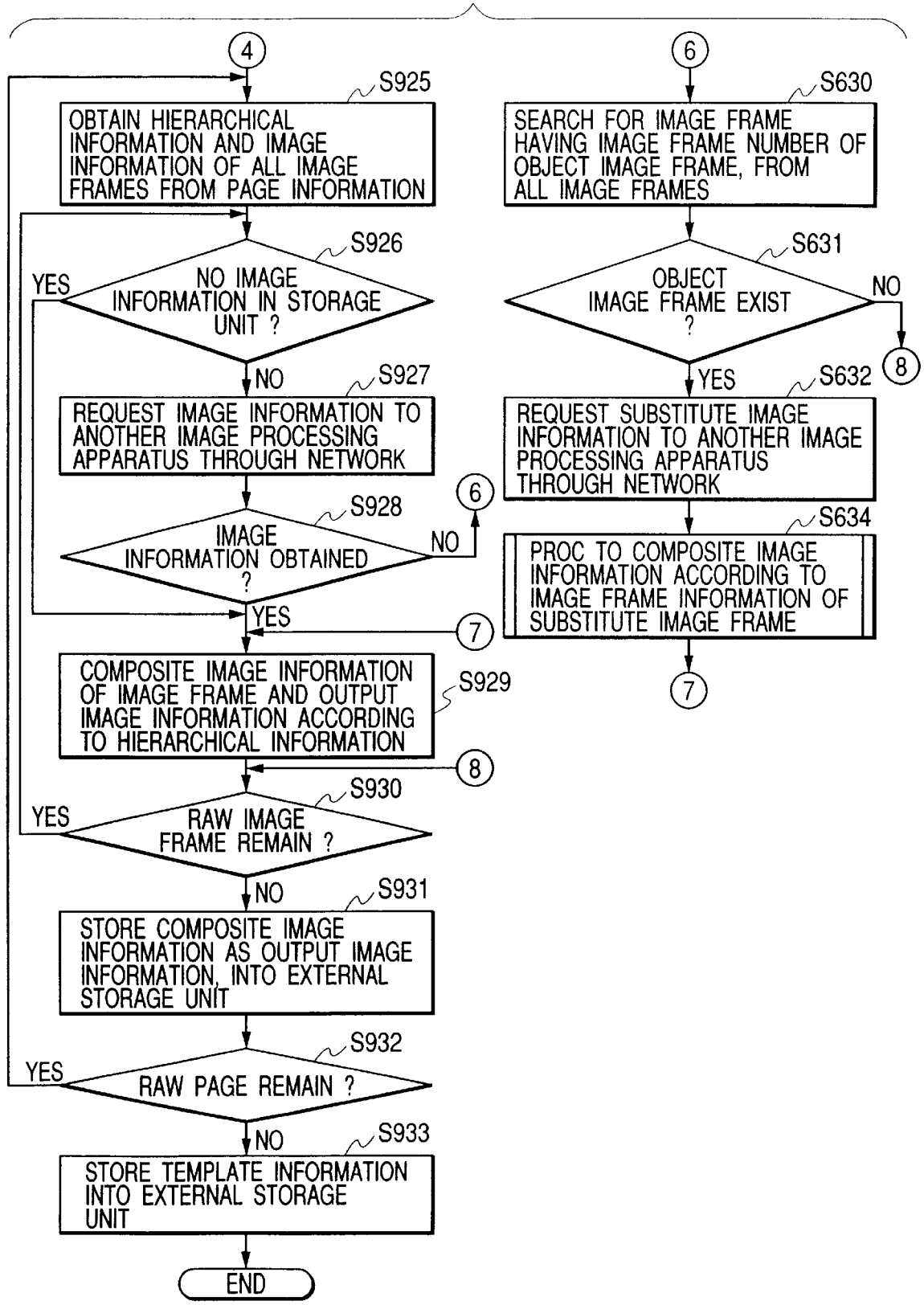
FIG. 11 is a flow chart for explaining processing to be performed in a case where storing of the template information in a storage method that only reprint can be performed is instructed, in the second embodiment.

If judged that such the instruction is to store the template information in the only-reprintable storage method, the flow advances to a step S925 (FIG. 11).

(Step S911)

If judged in the step S910 that such the instruction is not to store the template information in the only-reprintable storage method, then it is judged whether or not such the instruction is the instruction to output and print the template information.

Figure 12:
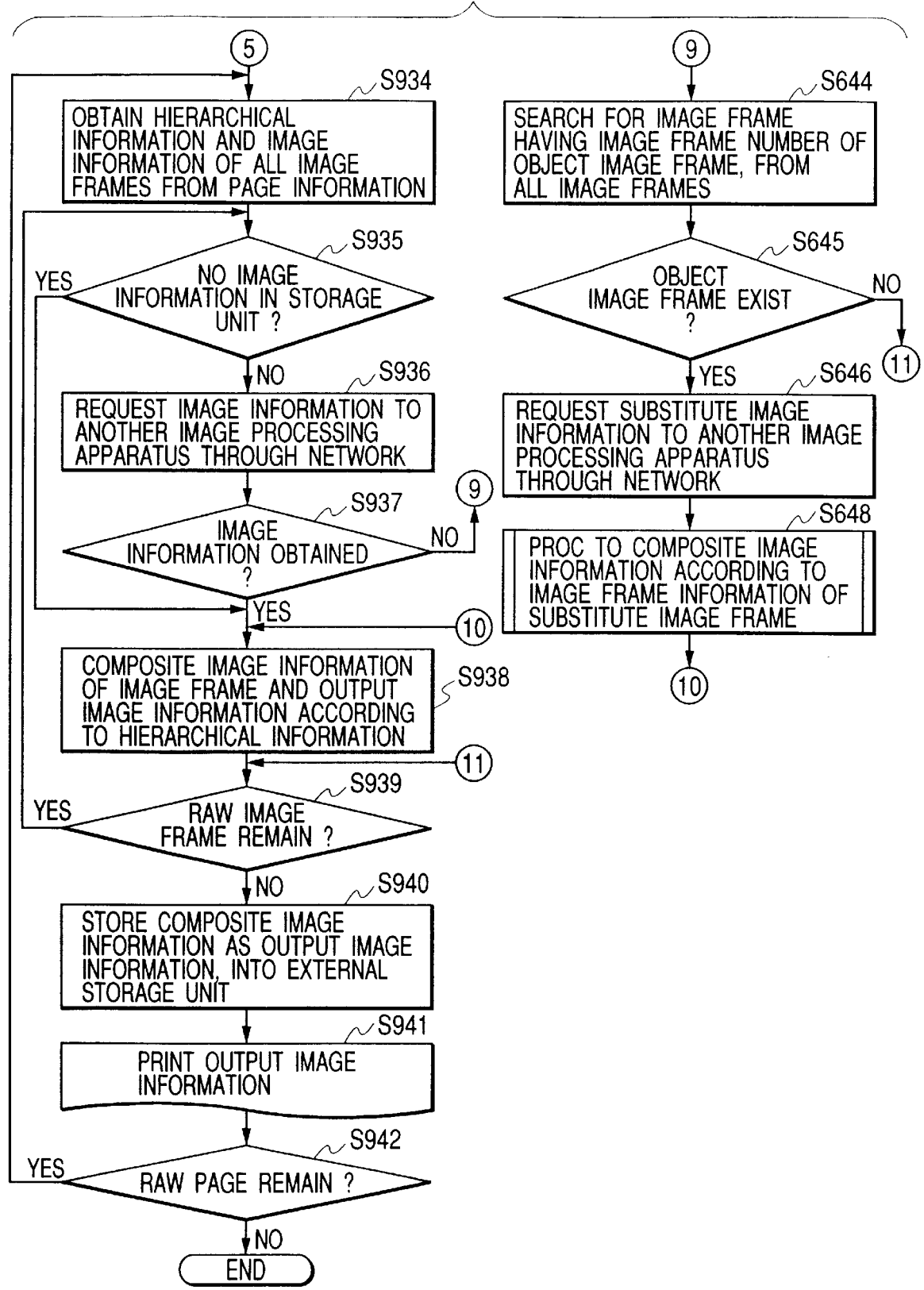
FIG. 12 is a flow chart for explaining processing to be performed in a case where print output of the template information is instructed, in the second embodiment.

If judged that such the instruction is to output and print the template information, the flow advances to a step S934 (FIG. 12).

Conversely, if judged that such the instruction is not to output and print the template information, i.e., if such the instruction does not correspond to either of the instructions in the steps S908 to S911, the processing ends.

(Steps S912, S913, S914, S915, S916 and S917: see FIG. 10)

If judged in the step S908 (FIG. 9) that the instruction from the user is to store the template information in the reeditable storage method, then the processing in the steps S912 to S917 is performed.

(Step S912)

First, all the image frame information having no setting for the new image frame number 329 (FIG. 2) of each page information of the template information are searched, and the processing in the sequential steps S913 to S915 is performed to the searched image frame information.

(Step S913)

The file name information which is in the object image frame information and has no setting for the new image frame number 329 is obtained, and the image information having such the file name is obtained from the HDD 103.

(Step S914)

The watermark image information to which luminance information is given is obtained from the HDD (main storage unit) 103.

(Step S915)

When the input image information obtained in the step S913 and the watermark image information obtained in the step S914 are composited by performing XOR calculation, thereby generating the watermark-added image information. Then the generated watermark-added image information is stored into the FDD (external storage unit) 102.

(Step S916)

It is judged whether or not the generating and storing of the watermark-added image information into the FDD 102 end for all the image frame information (i.e., the image frame information of which new image frame number 329 is "none") obtained in the step S912.

If judged that the generating and storing do not end yet, the flow returns to the step S912 to perform the processing in the steps S912 to S915 for the next image frame information.

(Step S917)

If judged in the step S916 that the generating and storing end for all the image frame information obtained in the step S912, the template information after such the processing is stored into the FDD (external storage unit) 102.

After then, the processing ends.
(Steps S918, S919, S920, S921, S922, S923 and S924: see FIG. 10)

If judged in the step S909 (FIG. 9) that such the instruction from the user is to store the template information in the only-reinsertable storage method, the processing in the steps S918 to S924 is performed, and then the above-described processing in the steps S912 to S917 is performed.
(Step S918)

First, the hierarchical information of all the image frame information having no setting for the new image frame number 329 (FIG. 2) of each page information of the template information is obtained.
(Step S919)

The attribute information of the two continuous image frame information are obtained in the order of lower value of the hierarchical information obtained in the step S918, and comparison of these information is performed.
(Step S920)

Based on the compared result in the step S919, it is judged whether or not both of the two attribute information are the information not to permit the insertion of the input image information.

If judged that the two attribute information are not the information not to permit the insertion of the input image, the flow advances to the later-described step S924.
(Step S921)

If judged in the step S920 that the two attribute information are the information not to permit the insertion of the input image information, the two image frames respectively corresponding to the two attribute information are composited to generate one image frame.

Namely, the file name information of both the image frames are obtained, and the input image information having these file names are obtained from the HDD 103. Then these input image information are composited to generate the composite image information (i.e., rendering processing), and the generated composite image information is stored as the image file into the HDD 103.
(Step S922)

Further, the position information and the size information of the two image frames are obtained, and the minimum image frame including these two image frames is newly formed.
(Step S923)

The file name of the composite image information obtained in the step S921 is set to the template information as the file name information of the image file newly formed in the step S922.
(Step S924)

It is judged whether or not the processing of the steps S919 to S923 ends for all the object image frame information (i.e., the image frame information of which new image frame number 329 is "none").

If judged that the processing does not end for all the object image frame information, the flow returns to the step S919 to perform the processing in the steps S919 to S923 for the next image frame. Conversely, if judged that the processing ends, the flow advances to the step S912 to perform the processing in the following steps S913 to S917.

It should be noted that, since the processing in the steps S912 to S917 is the same as that in the case where it is instructed to store the template information in the reeditable storage method, the detailed explanation thereof is omitted.
(Steps S925, S926, S927, S928, S929, S930, S931, S932 and S933, and steps S630, S631, S632 and S634: see FIG. 11)

If judged in the step S910 (FIG. 9) that the user's instruction is to store the template information in the only-reprintable storage method, then the processing in the steps S925 to S930 and the steps S630 to S632 and S634 is performed for each page information of the template information. After then, the processing (step S933) same as the above-described processing in the step S917 is performed.
(Step S925)

First, the hierarchical information of each image frame of the image information is obtained, and also the input image information corresponding thereto is obtained from the HDD 103.
(Step S926)

It is judged whether or not the input image information is obtained in the processing of the step S925, i.e., it is judged whether or not the input image information corresponding to the image frame exists in the HDD 103 for each image frame.

Also, it is judged whether or not the corresponding input image information exists in the FDD 102.

If judged that the input image information corresponding to the object image frame exists in the HDD 103 or the FDD 102, the flow advances to the later-described step S929.
(Step S927)

If judged in the step S926 that the input image information does not exist in the HDD 103 or the FDD 102, the information (i.e., the image file name information of the image frame in the step S925) of the file name of the object image information is transmitted to another image processing apparatus 200 through the network I/F 114, thereby performing communication to request the input image information.
(Step S928)

Based on the communication result in the step S927, it is judged whether or not the input image information can be obtained from another image processing apparatus 200.

If judged that the input image information can not be obtained, the flow advances to the later-described step S630 to obtain a substitute image to be inlaid into the image frame.
(step S929)

If judged in the step S928 that the input image information can be obtained in the communication, if judged in the step S926 that the input image information exists in the HDD 103, of if judged in the later-described step S631 that there is no image frame information, the input image information is composited in the order of lower value in accordance with the contents of the hierarchical information of the page information of the template information, thereby generating the output image information.
(Step S930)

It is judged whether or not the image compositing processing in the steps S926 to S929 ends for all the image frames.

If judged in the step S928 that the input image information is not transmitted from another image processing apparatus 200, the image compositing processing in the step S929 is not performed, and the judgment processing in the step S930 is directly performed.

If judged that the image compositing processing does not end for all the image frames, the flow returns to the step S926 to perform the processing in the steps S926 to S929 for the next image frame.
(Step S931)

If judged in the step S930 that the image compositing processing ends for all the image frames, then the file name of the output image information generated in the step S929 is set to the output image file name information of the object page information, and the obtained information is stored into the HDD 103. It should be noted that, like the processing in the steps S514 to S515, the electronic watermark compositing processing is simultaneously performed at this time.
(Step S932)

It is judged whether or not the storing of the output image information in the steps S925 to S931 ends for all the page information.

If judged that the storing does not end, the flow returns to the step S925 to perform the processing in the steps S925 to S931 for the next page information.
(Step S933)

If judged in the step S932 that the storing of the output image information ends for all the page information, also the template information is stored into the HDD 103.

After then, the processing ends.
(Step S630)

If judged in the step S928 that the input image information can not be obtained even by the communication through the network, a substitute image frame for the processing-object image frame is obtained. As the substitute image, it is possible to use a previously registered image in order to prevent that there is no image to be inlaid into the frame. In the present embodiment, it is explained that, if the image composited in the steps S919 to S923 can not be obtained, the original image before the compositing is captured and composited anew to give the substitute image. First, from each page information of the template information, the image frame information to which the image frame number of the processing-object image frame has been set is searched.

By referring to the information of the image frame to which the new image frame number 329 of FIG. 2 is set, the original image before the compositing can be known. Thus, such the processing as described above can be performed.
(Step S631)

Based on the searched result in the step S630, it is judged whether or not the image information to which the image frame number of the processing-object image frame is set exists.

If judged that such the image information does not exist, the flow advances to the above-described step S930 to perform the subsequent processing.
(Step S632)

If judged in the step S630 that such the image information exists, the image information is obtained from another image processing apparatus 200 through the network I/F 114 as a substitute image for the image which could not been obtained in the step S926.
(Step S634)

Based on the communication in the step S632, if the image information for the substitute image frame can be obtained, the image information is composited in the order of lower value of the hierarchical information of such the substitute image frame, thereby generating the substitute output image information. Then the flow advances to the later-described step S929 to perform the subsequent processing.
(Steps S934, S935, S936, S937, S938, S939, S940, S941 and S942, and steps S644, S645, S646 and S648: see FIG. 12)

If judged in the step S911 (FIG. 9) that the instruction from the user is to output and print the template information, the processing in the steps S934 to S940 which is substantially the same as the above-described processing in the steps S925 to S931 is performed, and subsequently the processing in the steps S644, S645, S646 and S648 is performed.
(Steps S934 to S940)

First, in the same manner as described above, the hierarchical information of each image frame and the input image information corresponding thereto are obtained on the basis of each page information of the template information (step S934). If judged that the input image information does not exist in the HDD 103 or the FDD 102 (step S935), the file name information of the input image information is transmitted to another image processing apparatus 200 through the network I/F 114, thereby performing communication to request the input image information (step S936).

If the input image information is transmitted from another image processing apparatus 200 through the network I/F 114 (step S937), the input image information is composited in the order of lower value of the contents of the hierarchical information, thereby generating the output image information (step S938), and the flow advances to the step S939.

If the input image information is not transmitted from another image processing apparatus 200, the image frame information (i.e., the image frame information of the substitute image frame) in which the image frame number of the processing-object image frame has been set from each page information of the template information to the new image frame number information 329 is searched, so as to obtain the substitute image frame of the processing-object image frame (step S644). If there is no image frame information of the substitute image frame (step S645), the flow advances to the later-described step S939.

If the image frame information of the substitute image frame exists (step S645), the file name information of the image information of the substitute image frame is transmitted to another image processing apparatus 200 through the network I/F 114 to request such the image information (step S646). As a result of such communication, if the image information of the substitute image frame is not transmitted from the apparatus 200 (step S647), the flow advances to the later-described step S939.

If the image information of the substitute image frame is received from another image processing apparatus 200 through the network I/F 114, the image information is composited in the order of lower value of the hierarchical information of such the substitute image frame, thereby generating the substitute output image information (step S648). Then the flow advances to the above-described step S938 to perform the subsequent processing.

It is judged whether or not the image compositing processing ends for all the image frames (step S939). If judged that the processing ends, the file name of the generated output image information is set to the output image file name of the page information (step S940).
(Step S941)

The output image information generated in the step S938 is output and printed from the printer 110 through the printer I/F 109.
(Step S942)

It is judged whether or not the printing of the output image information in the steps S934 to S941 ends for all the page information.

If judged that the printing does not end, the flow returns to the step S934 to perform the processing in the steps S934 to S941 and the processing in the steps S644, S645, S646 and S648 for the next page information.

Conversely, if judged that the printing of the output image information ends for all the page information, then the processing ends.
(Steps S653, S654, S655, S656, S657, S658, S659, S660, S661 and S662: see FIG. 13)

The processing in the steps S653 to S662 of FIG. 13 is the processing to composite the image information in the case where especially the watermark-added image is composited in the image compositing of the step S634 of FIG. 11, the step S648 of FIG. 12, or the like.
(Step S653)
If the image compositing processing starts by using the two image information as arguments (i.e., independent variable), it is judged whether or not watermark image information (called as "watermark image information a" and "watermark image information b" hereinafter) are mixed into the given image information (called as "image information A" and "image information B" hereinafter).
(Step S654)
If judged in the step S653 that any watermark image information is not mixed into the image information A and the image information B respectively, the image information A and the image information B are composited to generate the composite image information as the output image result. Then the processing ends.
(Step S655)
If judged in the step S653 that the watermark image information a and the watermark image information b are respectively mixed into the image information A and the image information B, the watermark information a is first separated from the image information A, thereby obtaining the original image information (called as "image information A'" hereinafter) of the image information A and the watermark image information a. Then the watermark information b is separated from the image information B, thereby obtaining the original image information (called as "image information B'" hereinafter) of the image information B and the watermark image information b.
(Step S656)
Subsequently, the image information A' and the image information B' are composited to obtain the composite image information of the original image information.
(Step S657)
Subsequently, the circumrectangle (called as "circumrectangle a'" hereinafter) of the watermark image information a is obtained, and also the circumrectangle (called as "circumrectangle b'" hereinafter) of the watermark image information b is obtained.
(Step S658)
It is judged whether or not overlap exists between the circumrectangle a' and the circumrectangle b'.
(Step S659)
Based on the judged result in the step S658, it is further judged whether or not overlap exists between the watermark image information a and the watermark image information b.

As a result of such the judgment, if there is no overlap between the watermark image information a and the watermark image information b, the flow directly advances to the later-described step S661.
(Step S660)
If judged in the step S659 that the overlap exists between the watermark image information a and the watermark image information b, the respective positions (i.e., watermark image information existing positions in the entire image) and the sizes of the watermark image information a and the watermark image information b are changed such that the circumrectangle a' does not overlap the circumrectangle b', and then the flow advances to the step S661.

As the processing to composite the watermark image information a and the watermark image information b such that the circumrectangle a' of the information a and the circumrectangle b' of the information b does not overlap, it is possible to apply various processing. For example, it is possible to perform processing to move the watermark image information on the basis of the barycenter of the circumrectangles and the distances from the circumrectangles, processing to move or modify the watermark image information on the basis of such the barycenter and the distances, and the like. It is also effective to change a color of the overlap portion. In any case, even if the watermarks overlap, the user only has to be able to recognize each watermark.
(Step S661)
The watermark image information a and the watermark image information b are composited to obtain the composite watermark image information.
(Step S662)
The composite image information obtained in the step S656 and the composite watermark image information obtained in the step S661 are composited to generate the composite result as the output image result. After then, the processing ends.

As explained above, according to the present embodiment, when the template information is stored into the external storage unit or the like, it is possible to store, together with this template information, the image information used for this template information. Further, among the image information to be stored, if the plural image information are composited and stored as one image information into the external storage unit or the like, it is possible to reduce the storage capacity which is necessary to store the template information into the external storage unit or the like.

Especially, since it is structured to store the information (i.e., image composite information) concerning the position and compositing method of the image information in case of compositing the image information, even if the necessary information can not be obtained from another apparatus or the like through the network, the image information (i.e., the substitute image information of such the necessary image information) before the compositing of the necessary image information is obtained based on the image composite information, whereby it is possible to restore the necessary image information and thus generate the output image information.

Further, if the electronic watermark image information is composited (or added) to the image information to be stored and then such the watermark-added image information is stored into the external storage unit or the like, it is possible to prevent that the image information is diverted to other purposes.

Further, when the two electronic watermark-added image information are composited, if these image information are composited such that the electronic watermark image information in these composited information do not overlap, it is possible to prevent that the electronic watermark image information included in the image information is ineffective.

Further, when the stored template information is reedited (or edited again), it is possible to obtain the necessary image information from another apparatus through the network to generate the output image information.

It is needless to say that the object of the present invention can be achieved in a case where a storage medium storing the program codes of a software for realizing the function of the above-described embodiments is supplied to a system or an apparatus and then a computer (or CPU or MPU) in the system or the apparatus reads and executes the program codes stored in the memory medium.

In this case, the program codes themselves read from the storage medium realize the function of the embodiment, and the storage medium storing such the program codes constitute the present invention.

The storage medium storing the program codes can be, for example, a ROM, a floppy disk, a hard disk, an optical disk, a magnetooptical disk, a CD-ROM, a CD-R, a magnetic tape, a non-volatile memory card, or the like.

It is needless to say that the present invention also includes not only the case where the functions of the above-described embodiments are realized by the execution of the program codes read by the computer, but also a case where an OS or the like functioning on the computer executes all or part of the process according to the instructions of the program codes, thereby realizing the function of the embodiment.

Further, it is needless to say that the present invention further includes a case where the program codes read from the storage medium are once stored in a memory provided in a function expansion board inserted in the computer or a function expansion unit connected to the computer, and a CPU or the like provided in the function expansion board or the function expansion unit executes all the process or a part thereof according to the instructions of such program codes, thereby realizing the functions of the embodiments.

What is claimed is:

1. An image processing apparatus comprising:
   image editing means for editing predetermined template information and input image information which includes watermark information; and
   reference relation storage means for storing reference relation information which represents reference relation between the template information and the image information in the editing processing by said image editing means,
   wherein, in the editing by said image editing means, plural images are composited together so that watermarks of the images to be composited are prevented from overlapping.

2. An apparatus according to claim 1, further comprising:
   image input means for inputting the image information;
   image information storage means for storing the image information input by said image input means;
   template information storage means for storing the template information;
   image output means for outputting the image information subjected to the editing processing by said image editing means; and
   storage means for storing the image information subjected to the editing processing by said image editing means, together with the template information used for said image information.

3. An apparatus according to claim 1, further comprising rendering means for compositing said plural images subjected to the editing processing based on the template information by said image editing means, to form one image information.

4. An apparatus according to claim 3, further comprising rendering control means for performing control of said rendering means on the basis of the template information.

5. An apparatus according to claim 3, further comprising image composite information storage means for storing at least either of position information and composite method information concerning each image information being the target of the image compositing by said rendering means.

6. An apparatus according to claim 1, further comprising:
   electronic watermark image information storage means for storing predetermined electronic watermark image information;
   electronic watermark image information addition means for adding the electronic watermark image information to the image information subjected to the editing processing by said image editing means; and
   electronic watermark image information elimination means for eliminating the electronic watermark image information from the image information to which the electronic watermark image information has been added.

7. An apparatus according to claim 6, further comprising electronic watermark image information compositing means for compositing electronic watermark image information of said plural images.

8. An apparatus according to claim 6, further comprising:
   circumrectangle information obtaining means for obtaining circumrectangle information of the electronic watermark image information; and
   judgment means for judging overlap of the plural circumrectangle information.

9. An apparatus according to claim 1, further comprising communication means for performing communication of the image information with another apparatus through a network.

10. An image processing method comprising:
    an image editing step of editing predetermined template information on the basis of input image information which includes watermark information; and
    a reference relation storage step of storing reference relation information which represents reference relation between the template information and the image information in said image editing step,
    wherein, in said editing step, plural images are composited together so that watermarks of the images to be composited are prevented from overlapping.

11. A method according to claim 10, wherein the reference relation information includes information for discriminating the image information used for the template information.

12. A method according to claim 10, wherein the reference relation information includes information for discriminating whether or not editing of the image information to the template information is possible.

13. A method according to claim 10, wherein the reference relation information is included in the template information.

14. A method according to claim 10, further comprising a rendering step of compositing plural images subjected to the editing processing based on the template information in said image editing step to form one image information.

15. A method according to claim 14, further comprising a rendering control step of performing processing operation control of said rendering step on the basis of the template information.

16. A method according to claim 14, further comprising an image composite information storage step of storing at least either of position information and composite method information concerning the image information at a time when said plural images are composited.

17. A method according to claim 10, further comprising:
    an electronic watermark image information storage step of storing predetermined electronic watermark image information;
    an electronic watermark image information addition step of adding the electronic watermark image information to the image information subjected to the editing processing; and
    an electronic watermark image information elimination step of eliminating the electronic watermark image information from the image information to which the electronic watermark image information has been added.

18. A method according to claim 17, further comprising an electronic watermark image information compositing step of compositing electronic watermark image information of said plural images.

19. A method according to claim 17, further comprising:
a circumrectangle information obtaining step of obtaining circumrectangle information of the electronic watermark image information; and
a judgment step of judging overlap of the plural circumrectangle information.

20. A method according to claim 10, further comprising a communication step of performing communication of the image information with another apparatus through a network.

21. A storage medium which stores therein a program to realize, when a computer reads and executes said program, an image processing method comprising:
an editing step of editing predetermined template information on the basis of input image information which includes a watermark; and
a reference relation storage step of storing reference relation information which is determined in said editing step and represents reference relation between the template information and the image information,
wherein, in said editing step, plural images are composited together so that watermarks of the images to be composited are prevented from overlapping.

22. An image processing apparatus comprising:
input means for inputting plural image information each of which includes an electronic watermark;
compositing means for compositing plural images respectively represented by the plural image information; and
control means for performing, when said compositing means composites the plural images, control such that, in a case where the electronic watermarks of the plural image information input by said input means overlap, each electronic watermark can be recognized.

23. An image processing method comprising:
an input step of inputting plural image information each of which includes an electronic watermark;
a compositing step of compositing plural images respectively represented by the plural image information; and
a control step of performing, when the plural images are composited in said compositing step, control such that, in a case where the electronic watermarks of the plural image information input in said input step overlap, each electronic watermark can be recognized.

* * * * *

UNITED STATES PATENT AND TRADEMARK OFFICE
CERTIFICATE OF CORRECTION

PATENT NO. : 6,580,806 B1
DATED : June 17, 2003
INVENTOR(S) : Hajime Sato

It is certified that error appears in the above-identified patent and that said Letters Patent is hereby corrected as shown below:

<u>Title page, Item [54] and Column 1, line 2,</u>
Title, "STORAGE" should read -- STORAGE MEDIUM --.

<u>Column 4,</u>
Line 55, "if the" should read -- if --.

<u>Column 6,</u>
Line 24, "effectively it is restrain or preferably inhibit" should read -- effectively restraining or preferably inhibiting that the image is diverted --.

<u>Column 9,</u>
Line 37, "new another" should read -- another new --;
Line 55, "are" should read -- is --;
Line 56, "these" should read -- this --; and
Line 62, "not the" should read -- the --.

<u>Column 12,</u>
Line 62, "image" should read -- images --.

<u>Column 15,</u>
Line 19, "exits," should read -- exists, --.

<u>Column 17,</u>
Line 17, "these" should read -- this --.

<u>Column 19,</u>
Line 45, "not been" should read -- not have been --.

UNITED STATES PATENT AND TRADEMARK OFFICE
CERTIFICATE OF CORRECTION

PATENT NO. : 6,580,806 B1
DATED : June 17, 2003
INVENTOR(S) : Hajime Sato

It is certified that error appears in the above-identified patent and that said Letters Patent is hereby corrected as shown below:

Column 24,
Line 44, "step" should read -- step, --.

Signed and Sealed this

Twenty-seventh Day of January, 2004

JON W. DUDAS
*Acting Director of the United States Patent and Trademark Office*